United States Patent [19]
Giordano

[11] Patent Number: 6,070,213
[45] Date of Patent: May 30, 2000

[54] TELECOMMUNICATIONS TERMINAL

[75] Inventor: Glenn Giordano, Allen, Tex.

[73] Assignee: DSC Telecom L.P., Plano, Tex.

[21] Appl. No.: 09/000,998

[22] Filed: Dec. 30, 1997

[51] Int. Cl.⁷ .................................................. G06F 13/00
[52] U.S. Cl. .......................................... 710/128; 370/431
[58] Field of Search .................................. 370/431–463; 710/128, 129

[56] References Cited

U.S. PATENT DOCUMENTS

| | | |
|---|---|---|
| 4,993,019 | 2/1991 | Cole et al. . |
| 5,105,421 | 4/1992 | Gingell . |
| 5,177,735 | 1/1993 | Blaszykowski et al. . |
| 5,237,563 | 8/1993 | McNulty . |
| 5,283,786 | 2/1994 | Hoff et al. . |
| 5,682,385 | 10/1997 | Garcia et al. ............................ 370/458 |
| 5,694,398 | 12/1997 | Doll et al. . |
| 5,740,157 | 4/1998 | Demiray et al. . |
| 5,901,024 | 5/1999 | Deschaine et al. ...................... 370/228 |

*Primary Examiner*—Ayaz R. Sheikh
*Assistant Examiner*—David A. Wiley
*Attorney, Agent, or Firm*—Fish & Richardson P.C.

[57] ABSTRACT

Telecommunications system apparatuses and methods are disclosed. The apparatuses include a telecommunications system having a data transmitting and receiving apparatus, subscriber buses, and channel unit cards. First and second subscriber buses provide, respectively, a communication path to a first and a second data transmitting and receiving apparatus. A plurality of channel unit cards are coupled to the first and second subscriber buses. In one mode of operation, at least one channel unit card communicates data over the first subscriber bus. In another mode of operation, at least one channel unit card communicates data over the first subscriber bus and at least one other channel unit card communicates data over the second subscriber bus. A method of configuring a telecommunications system is also disclosed. The method includes selecting groups of channel unit cards and configuring each group to communicate data over a first and a second subscriber bus. The method also includes configuring a first data transmitting and receiving unit to communicate with the first group of channel unit cards over the first subscriber bus and configuring a second data transmitting and receiving unit to communicate with the second group of channel unit cards over the second subscriber bus.

24 Claims, 6 Drawing Sheets

0
TELECOMMUNICATIONS TERMINAL

This invention relates to telecommunications terminals.

Telecommunications terminals connect subscriber lines, such as POTS (Plain Old Telephone Service) and ISDN (Integrated Services Digital Network) lines, to telecommunications exchanges and other telecommunications equipment. A terminal has channel unit card slots that accept pluggable channel unit cards and a backplane that interconnects signals from channel unit cards and other terminal components. Channel unit cards convert analog and digital signals exchanged over subscriber lines into formatted digital data signals that are exchanged over a terminal backplane. Various types of channel units exist to provide, for example, POTS, ISDN, T1, E1, and other transmission services.

SUMMARY

In general, in one aspect, the invention features a telecommunications system including a data transmitting and receiving apparatus, subscriber buses, and channel unit cards. A first subscriber bus provides a communication path to the data transmitting and receiving apparatus. A second subscriber bus provides a communication path to at least one other data transmitting and receiving apparatus. Channel unit cards are coupled to the first and second subscriber buses. The system includes a mode of operation in which at least one channel unit card communicates data over the first subscriber bus, and another mode of operation in which at least one channel unit card communicates data over the first subscriber bus and at least one other channel unit card communicates data over the second subscriber bus.

Implementations of the invention may include one or more of the following features. The second subscriber bus may be physically separate from the first subscriber bus. Channel unit cards may communicate data over the first subscriber bus but not over the second subscriber bus while in the first mode of operation. Data transmitting and receiving apparatuses may be bandwidth allocation, processing, and timing (BPT) units, may be integrated in a single unit, and may include time slot interchange circuitry. The channel unit cards may receive operations data over the first and second subscriber buses and may selectively transmit data over either the first subscriber bus or the second subscriber bus in response to the received operations data.

Implementations of the system may also include a bus select signal path coupling the channel unit cards to the data transmitting and receiving apparatuses. Each channel unit card may receive a signal on a bus select signal path and, in response to the received signal, may select either the first or second subscriber bus for communicating data. The system may include a first bus select signal line coupling one data transmitting and receiving apparatus to each of the channel unit cards and a second bus select signal line coupling another data transmitting and receiving apparatus to each of the channel unit cards. In the first mode of operation, one data transmitting and receiving apparatus may be configured to assert a signal on the first bus select signal line indicating that the first subscriber bus is active and another data transmitting and receiving apparatus may be configured to assert a signal on a second bus select signal line indicating that the second subscriber bus is inactive. In the second mode of operation, one data transmitting and receiving apparatus may assert a signal on a first bus select signal line indicating that the first subscriber bus is active and another data transmitting and receiving apparatus may assert a signal on a second bus select signal line indicating that the second subscriber bus is active.

In general, in another aspect, the invention features a data transmitting and receiving apparatus. The apparatus includes a backplane interface, subscriber bus interface circuitry, a data link, and a processor. The backplane interface couples the apparatus to a first subscriber bus. The subscriber bus interface circuitry has an active state wherein data is transmitted and received over the first subscriber bus and an inactive state wherein data is not transmitted and received over the first subscriber bus. The data link is used to transmit and receive data with an external apparatus. The external apparatus has subscriber bus interface circuitry to couple it to a second subscriber bus. The processor is coupled to the data link and to the subscriber bus interface circuitry and sends operations data over the data link to the external apparatus and to the subscriber bus interface circuitry for transmission over the first subscriber bus. The apparatus functions in a first and second operating mode. In the first operating mode, the processor configures the subscriber bus interface circuitry in an active state and sends operations data to the external apparatus to configure the external apparatus' subscriber bus interface circuitry in an inactive state. In the second operating mode, the processor configures the subscriber bus interface circuitry in an active state and sends operations data to the external apparatus to configure the external apparatus' subscriber bus interface circuitry in an active state.

Implementations of the invention may include one or more of the following features. The external apparatus may be another data transmitting and receiving apparatus. In the second operating mode, the processor may determine a first set of channel unit cards and a separate second set of channel unit cards, configure the first set of channel unit cards to send and receive data over the first subscriber bus, and configure the second set of channel unit cards to send and receive data over the second subscriber bus to the external apparatus. The system may include data switching circuitry coupled to the subscriber bus interface circuitry to receive data from a first set of channel unit cards and transmit the received data to a second set of channel unit cards.

In general, in another aspect, the invention features a method of communicating data. The method includes selecting a first and a second groups of channel unit cards, and configuring the first and second group of channel unit cards to communicate data over a first and a second subscriber bus, respectively. The method also includes configuring a first data transmitting and receiving unit to communicate with the first group of channel unit cards over the first subscriber bus and configuring a second data transmitting and receiving unit to communicate with the second group of channel unit cards over the second subscriber bus. In various implementations, configuring the first and the second group of channel unit cards may include transmitting operations data from the first data transmitting and receiving unit to the first and second group of channel unit cards.

In general, in another aspect, the invention features a method of managing data flow in a telecommunications system having two or more subscriber buses. The method includes selecting a mode of operation. If a first mode of operation is selected, at least one channel unit card is configured to communicate data over the first subscriber bus. If a second mode of operation is selected, at least one channel unit card is configured to communicate data over the first subscriber bus and at least one other channel unit card is configured to communicate data over the second subscriber bus. Implementations of the invention may include a first mode of operation wherein at least one channel unit card does not communicate data over the second subscriber bus.

The invention may provide one or more of the following advantages. An increased data rate over backplanes having redundant buses can be realized. A terminal unit may operate in a redundant configuration or in an enhanced bandwidth configuration. Enhanced data capacity over existing backplane designs may be realized.

Other advantages and features will become apparent from the following descriptions including the drawings and claims.

DETAILED DESCRIPTION

Figure 1:
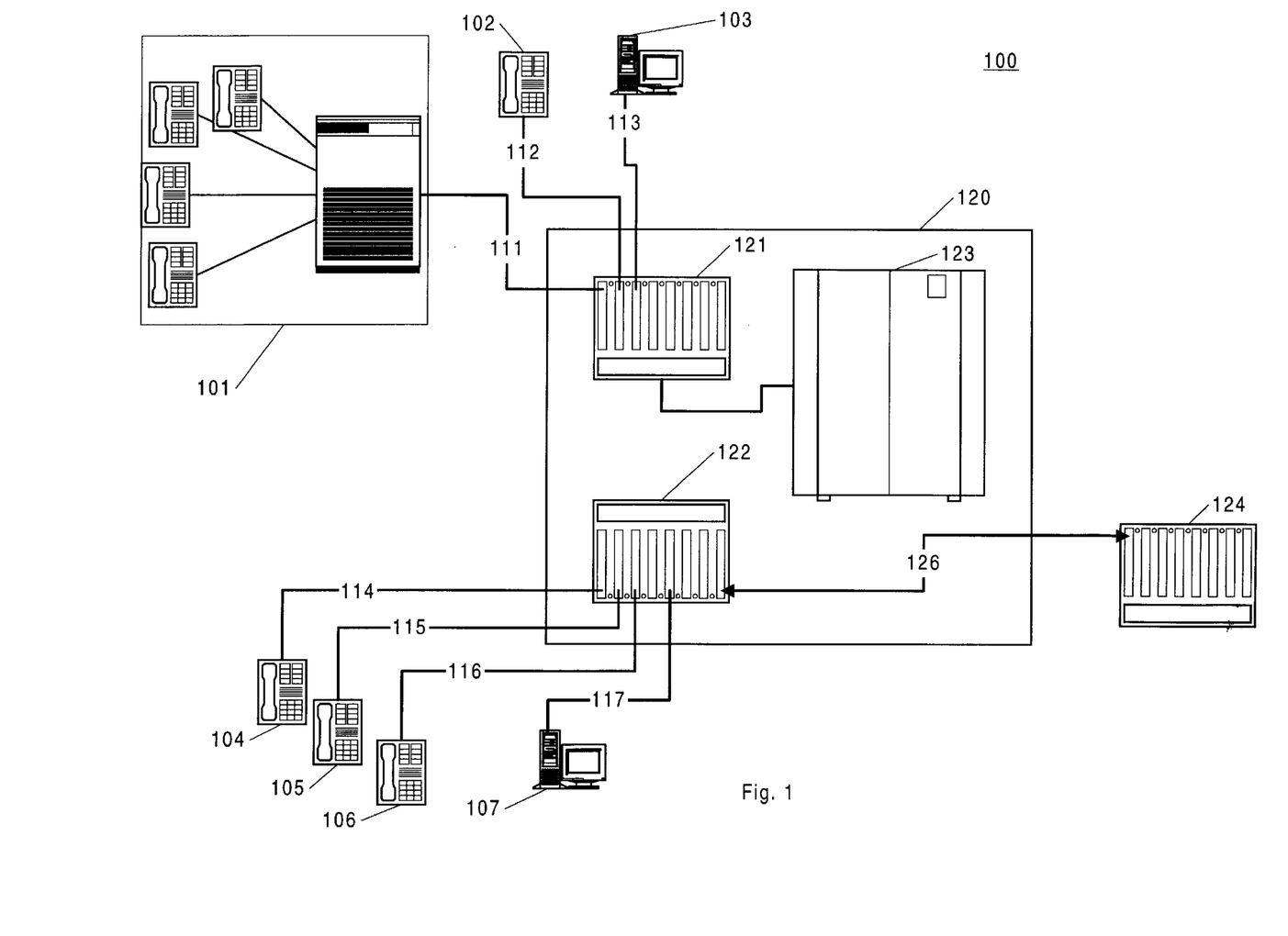
FIG. 1 is a telecommunications network.

FIG. 1 illustrates a telecommunications network. In the network 100, data signals are exchanged over subscriber lines 111–117 between customer premises equipment (CPE) 101–107 and a telephone company central office 120. Customer premises equipment includes, for example, private branch exchange (PBX) equipment 101, POTS analog phones 102 and 104–106, and integrated services digital network (ISDN) equipment 103 and 107. PBX equipment 101 may send and receive a T1 data signal over subscriber line 111. POTS phones 102 and 114–116 send and receive analog voice-band signals over subscriber lines 112 and 114–116, respectively. Integrated services digital network (ISDN) equipment 103 and 107 sends and receives digitally modulated data signals over subscriber lines 113 and 117, respectively. Subscriber lines 111–117 terminate at channel unit cards in telecommunications terminals 121 and 122. The telecommunications terminals may be coupled to central office switching equipment 123, or may be coupled to remote switching equipment 124.

Figure 2A:
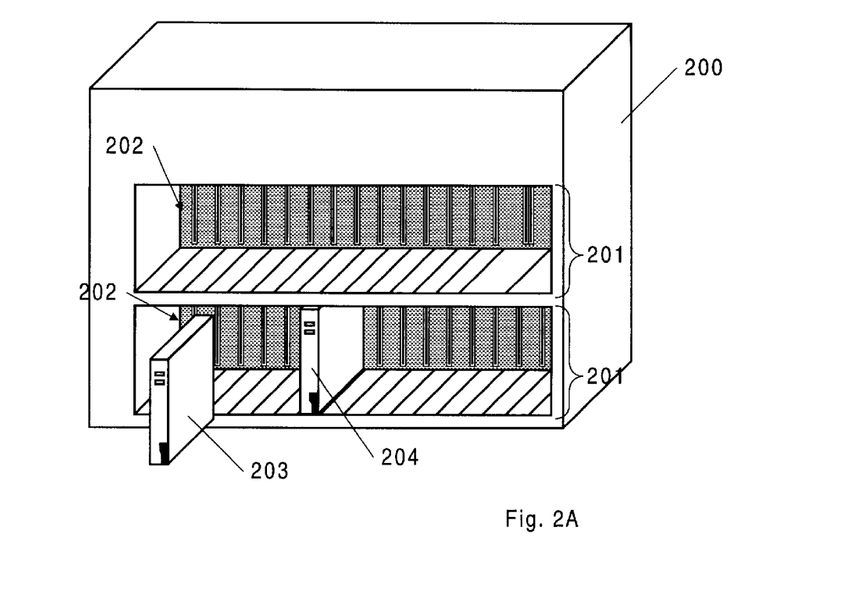
FIGS. 2A and 2B are telecommunications terminals and their components.
Figure 2B:
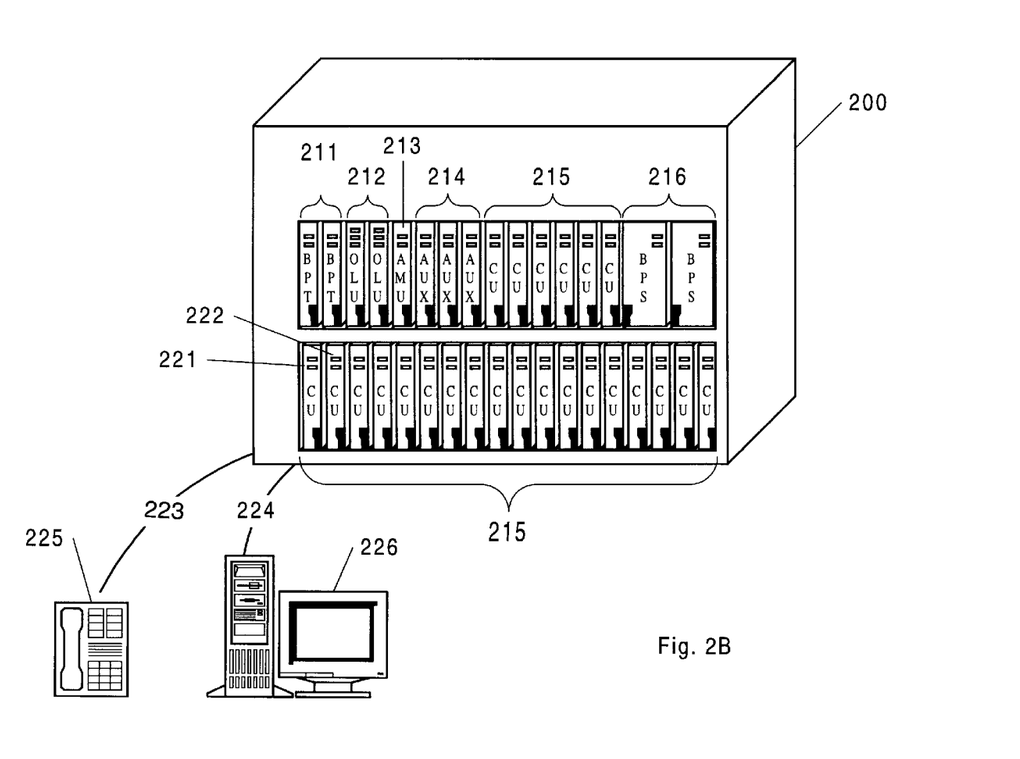

Referring to FIGS. 2A and 2B, a telecommunications terminal 200 includes rows of slots 201 that accept inserted cards 203 and 204. The terminal 200 includes a backplane 202. The backplane 202 has subscriber data buses and signal paths that interconnect inserted cards, such as data transmission cards including channel unit (CU) cards 215, auxiliary (AUX) cards 214, and optical line unit (OLU) cards or other transmission cards 212. The terminal also accepts bandwidth allocator, processor, and timing (BPT) cards 211. BPT cards perform modulation, de-modulation, and switching functions. The terminal may also accept bank power supply (BPS) cards 216 and alarm maintenance unit (AMU) cards 213. BPS cards supply electrical power to the other terminal cards. AMU cards can provide warning signals when environmental or other factors threaten the operation of the terminal.

Channel unit cards 215 transmit and receive data signals over subscriber lines. Subscriber lines connect to customer premises equipment, to central office telecommunications equipment, or to remote telecommunications equipment. A channel unit card 215 can receive analog or digital signals over subscriber lines, convert the received signal to a digital time division multiplexed (TDM) data signal, and send the TDM signal to a BPT card over a backplane subscriber data bus. Similarly, a channel unit card 215 can receive a TDM signal from a BPT card, convert the TDM signal to an analog or digital subscriber line signal, and send that signal over a subscriber line. Auxiliary (AUX) cards 214 are similar to channel unit cards but may include additional interfaces to MTAU (metallic test access units), RGU (ring generation unit), and other auxiliary units.

Various types of channel unit cards can be implemented and used to exchange different narrowband and wideband subscriber line signals. For example, POTS channel unit cards serves analog POTS lines 112 and 114–116, and ISDN channel unit cards serves digital ISDN subscriber lines 113 and 117 (FIG. 1). Other types of channel unit cards support, for example, narrowband and wideband telecommunications services including coin operated phone service, T1 data transmission, E1 data transmission, ground start and loop start trunk connections, and digital subscriber line service.

Bandwidth allocation, processor, and timing (BPT) cards 211 send and receive TDM data signals over subscriber buses on the backplane 202. The BPT can send and receive TDM data to and from channel unit cards 215 and to and from OLU cards 212. A BPT can perform multiplexing and de-multiplexing of TDM signals and can switch time slots within and among TDM signals. Additionally, the BPT can exchange operations, administration, maintenance and provisioning (OAMP) data with, channel unit cards 215, AUX cards 214, OLU cards 212, and other terminal components. OAMP data may include software programs to configure the operation of the channel unit, AUX, OLU, and other terminal cards.

Optical line unit (OLU) cards 212 provide transmission services between the terminal 200 and remote telecommunications equipment over a fiber optic communications medium. OLU cards 212 transmit and receive optical signals over the fiber optic communication medium 126 (FIG. 1) and exchange data signals over point-to-point backplane data links to BPT cards. OLU cards 212 may perform data scrambling/descrambling, and overhead functions including data framing, parity, and multiframing. In various implementations, OLU cards may not be required by the terminal or may exchange data with a BPT over a subscriber bus rather than using a separate point-to-point data link.

Figure 3:
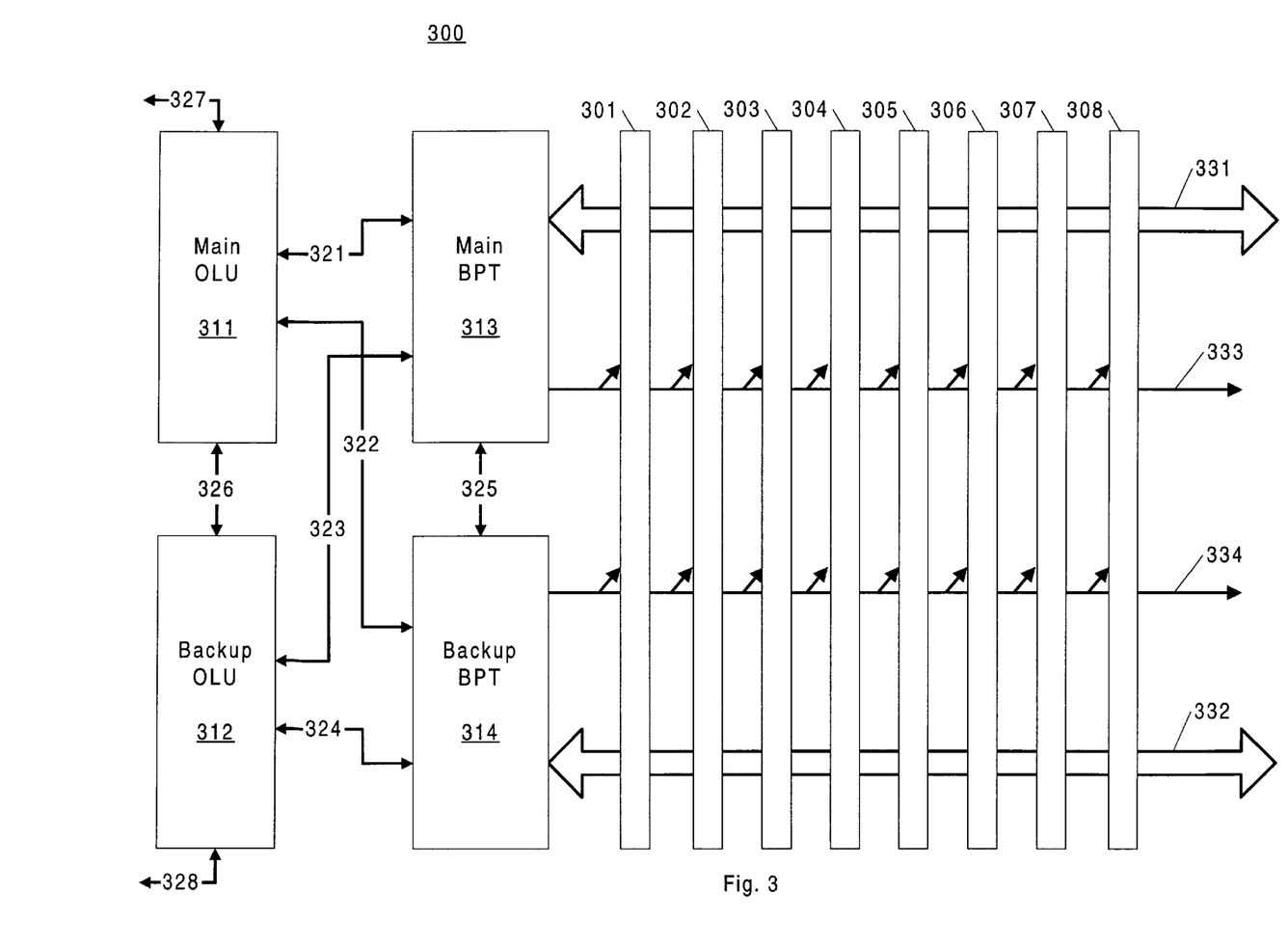
FIG. 3 is a backplane.

Channel unit, OLU. and BPT cards are connected over a terminal backplane. Referring to FIG. 3, a terminal backplane 300 is shown. The backplane 300 has slots receiving a main BPT 313 and a backup BPT 314, slots receiving a main OLU 311 and a backup OLU 312, and slots receiving eight channel unit cards 301–308. A main subscriber bus 331 electrically couples the main BPT in slot 313 to each channel unit card and a backup subscriber bus 332 electrically couples the backup BPT in slot 314 to each channel unit card. Each subscriber bus 331 and 332 can be active or inactive. When a subscriber bus is active data is exchanged over the subscriber bus. In contrast, when a subscriber bus is inactive, data is not exchanged over the subscriber bus. The active or inactive state of a subscriber bus 331 or 332 may, in turn, be determined by the configuration of other terminal components. Point-to-point data links 321–324 provide full interconnection between OLU cards and BPT cards.

Terminal backplane implementations can include additional or fewer channel unit slots and may include additional functional units, buses, and card slots. For example, terminal backplanes can include twenty-four channel unit slots as well as BPS and AMU card slots. Each subscriber bus 331 and 332 may be a shared bus, or may be a point-to-point bus having dedicated data paths between each channel unit card and the BPT, or may include both shared and dedicated data paths.

Figure 4:
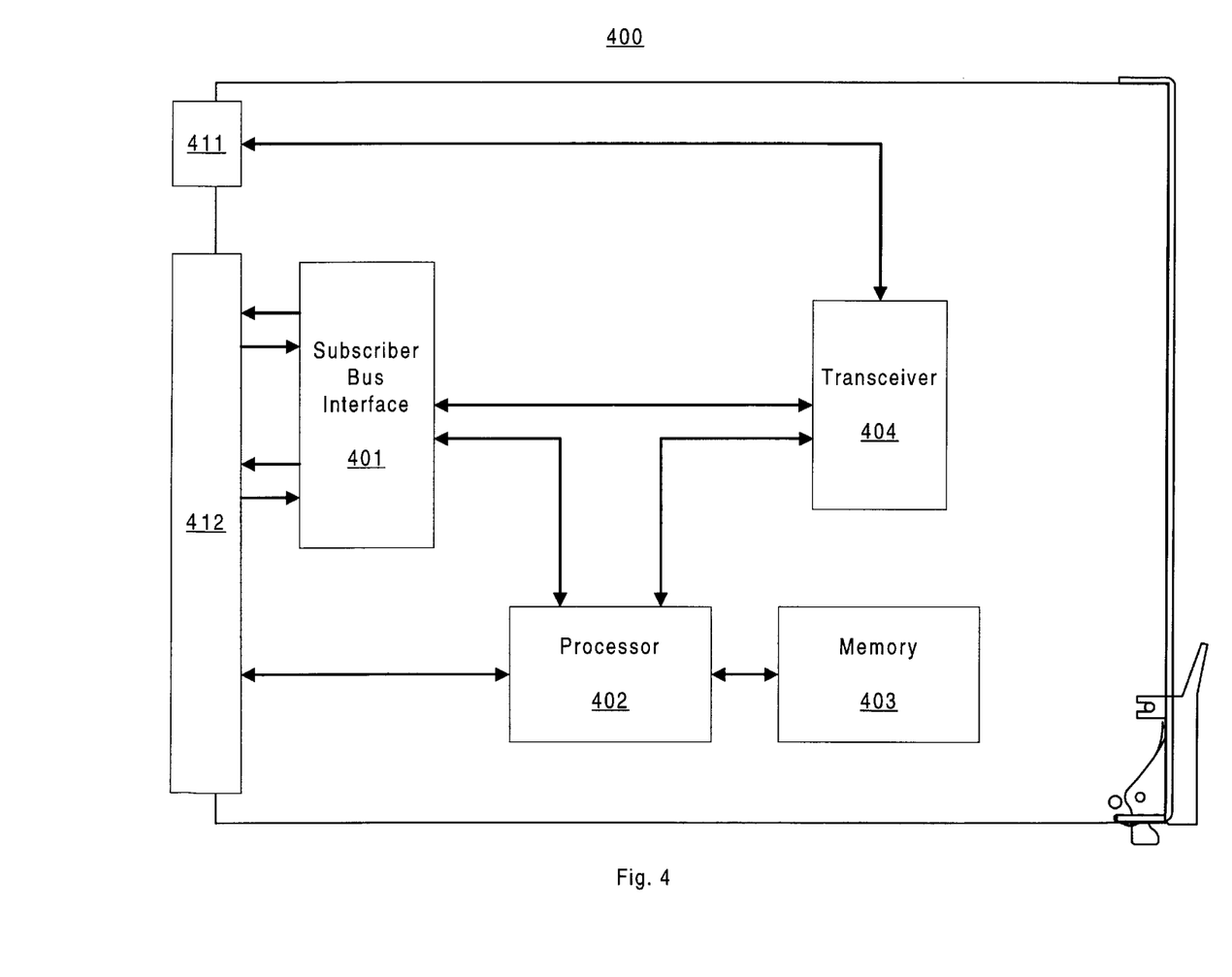
FIG. 4 is a channel unit card.

Channel units includes subscriber bus interface circuitry to connect to the backplane 300 and transceiver circuitry to transmit and receive signals over subscriber lines. Referring to FIG. 4, a block diagram of a channel unit is shown. The channel unit 400 includes subscriber bus interface circuitry 401, microprocessor 402, memory 403, and transceiver circuitry 404. Bus interface circuitry 401 is coupled to the main subscriber bus 331 and to the backup subscriber bus 332 (FIG. 3) by a bus connector 412. Transceiver circuitry 404 is coupled to a subscriber line by subscriber line connector 411.

Bus interface circuitry 401 transmits and receives TDM formatted digital data over a selected subscriber bus 331 or 332 (FIG. 3). The selected subscriber bus may be determined by the processor 402. TDM data can be sent from the subscriber bus interface circuitry 401 to the transceiver 404. Transceiver 404 modulates data from the subscriber bus interface 401 and transmits the modulated data over a subscriber line coupled to the subscriber line connector 411. Likewise, transceiver circuitry 404 can receive data from a subscriber line and send that data to transceiver 404 for transmission over a subscriber bus 331 or 332 (FIG. 3).

Channel unit control data can also be transmitted and received by bus interface circuitry 401 over a backplane subscriber bus 331 or 332 (FIG. 3) and can be transmitted and received by transceiver circuitry 404 over a subscriber line coupled to connector 411. Channel unit control data can be sent from the bus interface circuitry 401 or transceiver circuitry 404 to the processor 402. Control data received by the processor 402 can include operations, administration, maintenance, and provisioning (OAMP) data that directs the operation of the channel unit 400. Processor 402 can also provide data to the bus interface circuitry 401 and transceiver 404 for transmission over a subscriber bus or a subscriber line, respectively. In some implementations, TDM data received over a subscriber bus by the subscriber bus interface 401 is sent to the processor 402 which can extract selected data from the TDM data stream, format and manipulate the data based on programs stored in memory 403, and provide data to transceiver 404 for transmission over a subscriber line. Likewise, in some implementations, data received over a subscriber line by the transceiver 404 is sent to the processor 402 which can extract selected data, format and manipulate the data based on programs stored in memory 403, and provide the formatted data to the bus interface circuitry 401 for transmission over a subscriber bus 331 or 332 (FIG. 3). In some implementations, control data may be sent over separate bus connections between channel units and a control processor.

Figure 5:
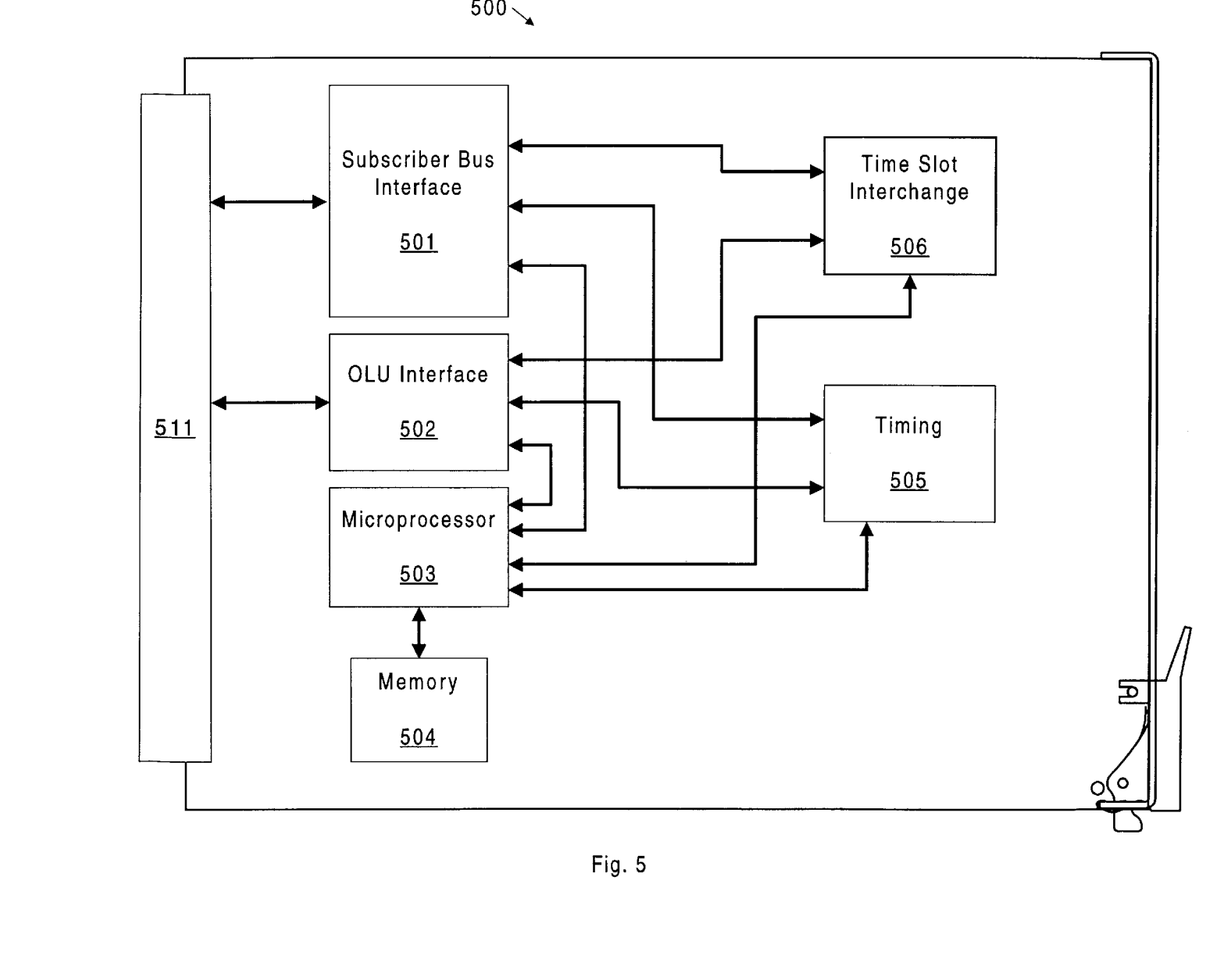
FIG. 5 is a bandwidth allocation, processor, and timing card.

Referring to FIG. 5, a bandwidth allocator, processor and timing (BPT) card 500 is shown. The BPT 500 includes subscriber bus interface circuitry 501, OLU interface circuitry 502, processor 503, memory 504, timing circuitry 505, and time slot interchange (TSI) circuitry 506. The bus interface circuitry 501 is coupled to terminal backplane subscriber buses by connector 511 and can exchanges TDM data signals with channel unit cards. OLU interface circuitry 502 provides an interface to OLU data links 321 and 323 or data links 322 and 324 (FIG. 3). OLU interface circuitry 502 transmits and receives TDM data streams from OLU cards in slots 311 and 312 (FIG. 3). TDM data signals can be sent from subscriber bus 501 and OLU interface 502 circuitry to the TSI circuitry 506. TSI circuitry 506 can multiplex, de-multiplex, and switch time slot data among multiple TDM data streams and provide TDM data to bus 501 and OLU 502 interface circuitry for transmission over backplane buses.

The BPT processor 503 can control various components of the terminal 200 (FIG. 2B). Processor 503 can send and receive OAMP data over a subscriber bus coupled to interface circuitry 501 and over OLU data links coupled to interface circuitry 502. Processor 503 may also be directly coupled to backplane signal paths. Processor 503 stores and retrieve programs and data in memory 504 to control the operation of the BPT card 500 and other terminal components. For example, the microprocessor 503 can configure TDM data stream processing by the TSI circuitry 506 and can enable or disable subscriber bus accessed by the bus interface circuitry 501. Additionally, memory 404 stores OAMP data associated with terminal unit cards 212–215 (FIG. 2B). For example, memory 504 can store various channel unit configuration programs that can be downloaded by the BPT processor 503 to selected channel units 215 (FIG. 2B). The BPT also includes timing circuitry 505. Timing circuitry 505 can generate, receive, and distribute clock timing signals among terminal components to synchronize data transmission by terminal cards. In various implementations, a BPT can include other components and circuit elements as described in, for example, U.S. patent application Ser. No. 08/970,183, entitled "Telecommunications Terminal" and filed on Nov. 14, 1997, incorporated herein by reference. Additionally, in some implementations, BPT 500 functions may be provided by separate terminal cards. For example, in some implementations, timing functionality, time slot interchange functionality, and control functionality may be provided by three separate cards.

A BPT may be coupled to an optical line unit (OLU) card. An OLU card converts electrical signals received over OLU data links 321–324 (FIG. 3) to optical signals and transmits the optical signals over fiber optic medium to remote telecommunications equipment (not shown). OLU cards may perform transmission functions and may have circuitry similar to that of a channel unit cards 400. An OLU card includes backplane interface circuitry enabling high speed data transmission over dedicated buses 321 and 322 or 323 and 324 to the main and backup BPT cards. In various implementations, OLU cards may be replaced by other transmission cards having, for example, a coaxial cable, twisted wire pair, or wireless radio transmission link to remote telecommunications equipment or may not be required in a telecommunications terminal.

Referring back to FIG. 3, the backplane 300 can operate in a redundant configuration. In a redundant configuration, a main BPT is inserted in slot 313 and a backup BPT is inserted in slot 314. The main and backup BPTs are interconnected by BPT data path 325. BPT status messages and other data are sent over data path 325 between the main and backup BPT. The BPT status messages include messages that indicate whether the main BPT is "active" or whether it is in a "standby" or "failure" state. When the main BPT is in the active state, it exchanges data with channel units in slots 301–308 over the main subscriber bus 331. Conversely, when the main BPT is in a standby or failure state, it does not exchange data over the main subscriber bus 331. Similarly, the backup BPT may be in an active, standby, or failure state. When active, the backup BPT exchanges data with channel units over the backup subscriber bus 332 and when in a "standby" or "failure" state it does not exchange data over the backup subscriber bus 332.

During redundant operation, one BPT and, correspondingly, one subscriber bus is active at a time. Thus, when the main BPT is active, the main subscriber bus is active, the backup BPT is in the standby or failure state, and the backup subscriber bus is inactive. Similarly, when the backup BPT is active, the backup subscriber bus is active, the main BPT will be in the standby or failure state, and the main subscriber bus is inactive. BPTs coordinate their operating state by exchanging signaling messages over the BPT data path 325. For example, the main BPT may indicate an active, standby, or failure state in a message sent over data path 325. When the backup BPT receives an active state message from the main BPT, it will switch to, or remain in, the standby state. The backup BPT similarly may send status messages to the main BPT. In various embodiments, status information may be sent in, for example, binary message sent over a data path between the BPTs 325, or as non-binary voltage levels sent over a backplane signal line connecting the main and backup BPTs. A BPT in the inactive or standby state may continue to exchange data with a second BPT and may OAMP data, such as state information data, to channel units.

Channel units in slots 301–308 can send and receive data selectively over an active subscriber bus 331 or bus 332. Channel units can select a subscriber bus 331 or 332 based on bus select signals received from the main and backup BPTs over bus select signal paths 333 and 334, respectively. The select signal may be received by bus interface circuitry 401 and sent to the data processor 402 or may be received by a separate processor 402 to backplane coupling. A bus select signal may be asserted or de-asserted by a BPT in slots 313 or 314 over its bus select signal path 333 or 334, respectively. An asserted signal on path 333 indicates that the main BPT 313 and main subscriber bus 331 active while a de-asserted signal indicate that the main BPT and main subscriber bus are inactive. Similarly, an asserted signal on path 334 indicates that the backup BPT 314 and backup subscriber bus 332 is active while a de-asserted signal indicates that the backup BPT and backup subscriber bus are inactive. The channel unit's response to received bus select signals can be determined by a bus selection program stored permanently in channel unit memory 403 or dynamically downloaded from a BPT.

To increase the aggregate data transfer capacity between channel unit cards and BPTs, a terminal 200 can be operated in a non-redundant mode wherein both BPTs as well as subscriber buses 331 and 332 are operated simultaneously. This mode is referred to herein as a "dual active bus" mode. In dual active bus mode, the main and backup BPTs are active simultaneously. Additionally, channel units in slots 301–308 are independently configured to select and operate over either the main subscriber bus 331 or the backup subscriber bus 332. The channel units can be independent configuration by OAMP data received from a BPT.

Referring to FIGS. 2, 3, 5 and 6, in one dual active bus implementation, the backplane 300 and terminal cards 211–215 operate in a redundant mode configuration when they are initialized 601. In this initial redundant mode configuration, the main BPT asserts its bus select signal on path 333 and the backup BPT de-asserts its bus select signal on signal path 334. Channel units in slots 301–308 are thereby directed to communicate with the main BPT over the main subscriber bus 331. The main BPT may thereafter determine whether to continue operating in a redundant configuration, or whether to switch to a dual active bus mode 602. This determination may be based on command signals from a network management system coupled to the terminal 200 or may be based on data stored in BPT memory 504.

Figure 6:
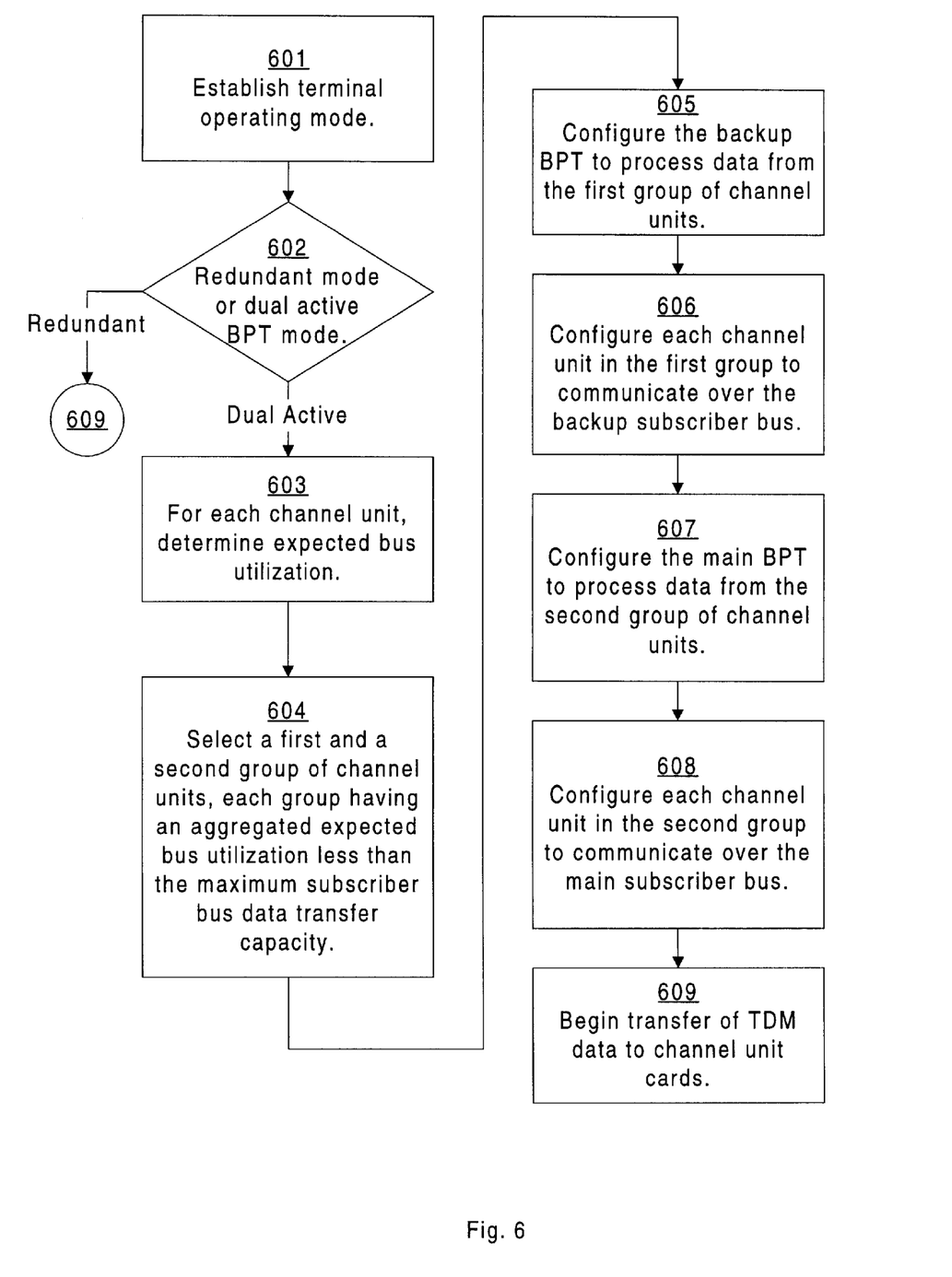
FIG. 6 is a flowchart.

If the terminal 200 is to operate in redundant mode, the main BPT may begin sending TDM data to channel unit cards for transmission over subscriber lines 610. If the terminal is to operate in dual active bus mode, the main BPT partitions the channel unit cards into two groups based on expected bandwidth utilization. To partition the channel unit cards into two groups, the main BPT first determines the expected bus utilization of each channel unit 603. The bus utilization may be determined based on channel unit type and expected data rate information stored in BPT memory 504. The BPT then determines a first and a second group of channel units such that each group has an expected aggregated subscriber bus utilization less than the maximum data transfer capacity of a subscriber bus 604. The main BPT then configures the backup BPT to control and exchange data with the first group of channel units. To configure the backup BPT, the main BPT sends data and commands over the data path 325 to the backup BPT 605.

Additionally, the main BPT sends configuration data to each channel unit in the first group instructing those channel units to operate over the backup subscriber bus 332, 606. The configuration data sent to the first group of channel units can include software routines that determine the subscriber bus accessed by the channel unit. The main BPT and channel units in the second group are similarly configured to operate over the main subscriber bus 607, 608. The main and backup BPT then may begin simultaneous operation, with the main BPT communicating with the second group of channel units and the backup BPT communicating with the first group of channel units. Channel units may be instructed to enter dual active bus mode by active signals on both bus select lines, or by a message sent from a BPT to the cards, or by re-configuration software downloaded to the cards, or by other methods.

In some implementations, BPTs can operate in a dual active bus mode wherein each channel unit card can communicate simultaneously over both the main subscriber bus and the backup subscriber bus. In such implementations, the total aggregate data sent to and received from a channel unit card is time-slot partitioned among the main subscriber bus and the backup subscriber bus. For example, a T1 channel unit can receive a 1.544 Mbps T1 data stream from a subscriber line and transmit the data over terminal backplane subscriber buses. The T1 data stream may be formatted as a series of data frames, each frame including twenty-four time slots, each time slot including eight data bits. A channel unit may partition this data stream by selecting, for example, eight time slots to be transmitted over the main subscriber bus and sixteen time slots to be transmitted over the backup subscriber bus. The channel unit may select time slots as determined by OAMP data received from a BPT or by configuration data permanently stored in memory 403 (FIG. 4).

In some implementations, non-TDM data may be exchanged over the backplane 300 by BPTs, channel units, OLUs, and other terminal components and over subscriber lines. For example, asynchronous transfer mode (ATM) cells or Ethernet packet data may be transmitted over a terminal's backplane or over subscriber lines. In some implementations, the main and backup subscriber buses may couple the channel units to a single wherein main and backup BPT functions are integrated. Such an integrated BPT may include main subscriber bus interface circuitry separate from backup subscriber bus interface circuitry and may include such circuitry integrated on a single circuit chip.

Terminal systems employing a dual active bus mode may realize increased data throughput, decreased bus access latency, increased channel unit capacity, and other advantages.

Other implementations are within the scope of the following claims.

What is claimed is:

1. A data transmitting and receiving control system comprising:

a backplane interface operative to couple a first controller to a first subscriber bus;

subscriber bus interface circuitry having an active state wherein data is transmitted and received over the first subscriber bus and an inactive state wherein data is not transmitted and received over the first subscriber bus;

a data link operative to transmit and receive data with a second controller having subscriber bus interface circuitry operative to couple the second controller to a second subscriber bus;

a processor coupled to the data link and to the first controller's subscriber bus interface circuitry and configured to send operations data over the data link to the second controller and to send operations data to the first controller's subscriber bus interface circuitry for transmission over the first subscriber bus; and wherein in a first operating mode, the processor configures the first controller's subscriber bus interface circuitry in an active state and sends operations data over the data link to the second controller to configure the second controller's subscriber bus interface circuitry in an inactive state, and in a second operating mode, the processor configures the first controller's subscriber bus interface circuitry in an active state and sends operations data over the data link to the second controller to configure the second controller's subscriber bus interface circuitry in an active state.

2. The control system of claim 1 wherein, in the second operating mode, the processor:

a) determines a first set of channel unit cards and a separate second set of channel unit cards;

b) configures the first set of channel unit cards to send and receive data over the first subscriber bus;

c) configures the second set of channel unit cards to send and receive data over the second subscriber bus.

3. The control system of claim 1 further comprising data switching circuitry operatively coupled to both the first controller's subscriber bus interface circuitry and to the second controller's subscriber bus interface circuitry to receive data from a first channel unit card and transmit the received data to a second channel unit card.

4. In a telecommunications system comprising a plurality of channel unit cards each coupled to a first data transmitting and receiving controller over a first backplane subscriber bus and to a second data transmitting and receiving controller over a second backplane subscriber bus, a method of communicating data over the first and second subscriber buses comprising:

selecting first and second groups of channel unit cards based upon expected bus utilization;

configuring the first group of channel unit cards to communicate data over the first subscriber bus;

configuring the second group of channel unit cards to communicate data over the second subscriber bus;

configuring the second data transmitting and receiving controller to communicate with the second group of channel unit cards over the second subscriber bus;

configuring the first data transmitting and receiving controller to communicate with the first group of channel unit cards over the first subscriber bus.

5. The method of claim 4 wherein configuring the first group of channel unit cards comprises transmitting operations data from the first data transmitting and receiving controller to the first group of channel unit cards.

6. The method of claim 4 wherein configuring the second data transmitting and receiving controller comprises transmitting operations data from the first data transmitting and receiving controller to the second data transmitting and receiving controller.

7. A method of managing data flow in a telecommunications system having two or more subscriber buses, the method comprising:

selecting between a redundant bus mode of operation and a dual active bus mode of operation;

if the redundant bus mode of operation is selected, configuring at least one channel unit card to communicate data over the first subscriber bus while the second subscriber bus remains inactive; and if the dual active bus mode of operation is selected, configuring at least one channel unit card to communicate data over the first subscriber bus and configuring at least one other channel unit card to communicate data over the second subscriber bus.

8. A telecommunications system comprising:

control circuitry for managing telecommunications data flow;

a plurality of channel unit cards;

a first subscriber bus providing a first communications path between the control circuitry and the plurality of channel unit cards;

a second subscriber bus providing a second communications path between the control circuitry and the plurality of channel unit cards;

the control circuitry being capable of selectively operating in a first mode in which the second subscriber bus is inactive and the control circuitry communicates with one or more channel unit cards over the first subscriber bus;

the control circuitry being capable of selectively operating in a second mode in which the control circuitry communicates with one or more channel unit cards over the first subscriber bus or over the second subscriber bus or over both subscriber buses substantially simultaneously.

9. The system of claim 8 wherein in the second mode, the control circuitry communicates with a first set of channel unit cards over the first subscriber bus and with a second set of channel unit cards over the second subscriber bus.

10. The system of claim 8 wherein in the second mode, each channel unit card communicates over both the first subscriber bus and the second subscriber bus substantially simultaneously.

11. The system of claim 8 wherein the control circuitry is integrated in a single unit.

12. The system of claim 8 wherein the control circuitry comprises time slot interchange circuitry.

13. The system of claim 8, further comprising a bus select signal path operatively coupling the plurality of channel unit cards to the control circuitry, and wherein each channel unit card is configured to receive a signal on the bus select signal path and, in response to the received signal, select either the first subscriber bus or the second subscriber bus for communicating data.

14. The system of claim 8 wherein the control circuitry comprises a first controller and a second controller, each controller controlling bandwidth allocation, processing, and/or timing.

15. The system of claim 14 wherein the first controller is connected to the first subscriber bus and the second controller is connected to the second subscriber bus.

16. The system of claim 15, further comprising:
a first bus select signal line coupling the first controller to each of the channel unit cards; and
a second bus select signal line coupling the second controller to each of the channel unit cards; and wherein
in the first mode of operation, the first controller asserts a signal on the first bus select signal line indicating that the first subscriber bus is active and the second controller asserts a signal on the second bus select signal line indicating that the second subscriber bus is inactive.

17. The system of claim 16, wherein in the second mode of operation, the first controller asserts a signal on the first bus select signal line indicating that the first subscriber bus is active and the second controller asserts a signal on the second bus select signal line indicating that the second subscriber bus is active.

18. The system of claim 8, wherein the channel unit cards are configured to receive operations data over the first and second subscriber buses and to selectively transmit data over either the first subscriber bus or the second subscriber bus in response to the received operations data.

19. A method of controlling a telecommunications apparatus having a first subscriber bus, a second subscriber bus, and a plurality of channel unit cards, each channel unit card connected to both the first subscriber bus and the second subscriber bus, the method comprising:
in a first mode, selectively configuring the channel unit cards to communicate over the first subscriber bus when a control component is operating properly and to communicate over the second subscriber bus when the control component is unavailable; and
in a second mode, selectively configuring each channel unit card to communicate over the first subscriber bus or over the second subscriber bus, or over both subscriber buses substantially simultaneously.

20. The method of claim 19 wherein the first mode comprises a redundant bus mode.

21. The method of claim 19 wherein the second mode comprises a dual active bus mode.

22. The method of claim 19, further comprising, in the second mode, determining whether to communicate over the first subscriber bus, the second subscriber bus, or both subscriber buses based upon expected bus utilization.

23. The method of claim 22 wherein expected bus utilization corresponds to a type of a channel unit card or expected data rate for a channel unit card or a combination of type and expected data rate for a channel unit card.

24. A method of controlling a telecommunications apparatus having a first subscriber bus, a second subscriber bus, and a plurality of channel unit cards, each channel unit card connected to both of the first subscriber bus and the second subscriber bus, the method comprising:
partitioning the plurality of channel unit cards into a first subset and a second subset, each subset comprising one or more channel unit cards, based upon an expected bus utilization of each channel unit card; and
configuring the first subset of channel unit cards to communicate over the first subscriber bus; and
configuring the second subset of channel unit cards to communicate over the second subscriber bus.

* * * * *